United States Patent [19]

Olla

[11] 4,302,717
[45] Nov. 24, 1981

[54] POWER SUPPLY WITH INCREASED DYNAMIC RANGE

[75] Inventor: Robert S. Olla, Livermore, Calif.

[73] Assignee: Fairchild Camera and Instrument Corp., Mountain View, Calif.

[21] Appl. No.: 118,168

[22] Filed: Feb. 4, 1980

[51] Int. Cl.³ .............................................. G05F 1/44
[52] U.S. Cl. .................................... 323/282; 323/324; 363/89
[58] Field of Search ...................... 323/22 T, 265, 282, 323/324; 363/89

[56] References Cited

U.S. PATENT DOCUMENTS

| | | | |
|---|---|---|---|
| 3,210,647 | 10/1965 | Dyke | 323/22 T |
| 3,470,444 | 9/1969 | Bixby | 363/86 |
| 3,596,172 | 7/1971 | Harrison | 323/45 |
| 3,603,865 | 9/1971 | Liebenthal | 323/22 T |
| 3,742,330 | 6/1973 | Hodges et al. | 363/41 |
| 3,798,531 | 3/1974 | Allington | 323/22 T X |
| 4,051,543 | 9/1977 | McLellan | 323/22 T X |

Primary Examiner—William M. Shoop
Attorney, Agent, or Firm—Paul J. Winters; Ronald J. Meetin; Michael J. Pollock

[57] ABSTRACT

A power supply circuit impresses a signal supplied by a pulse generator (28) at one frequency on an alternating current such as a standard AC signal at 115 volts RMS and 60 hertz by utilizing a single switching transistor (Q1) coupled between the pulse generator (28) and a current-directing element (14) which, in turn, is serially coupled between a source (10) of the alternating current and a load (18). The resultant bidirectional output voltage across the load (18) may be rectified and averaged to produce a substantially constant DC voltage whose level is regulatable by controlling the duty cycle of the pulse generator (28).

17 Claims, 6 Drawing Figures

POWER SUPPLY WITH INCREASED DYNAMIC RANGE

FIELD OF THE INVENTION

This invention relates generally to power supplies. More particularly, this invention relates to precision power supply circuits for impressing a signal at a first frequency which may be variable on an alternating current (AC) at another frequency lower than the first frequency. This invention also relates to precision power supply circuits for converting an alternating current to a substantially constant direct current (DC) having an improved dynamic voltage and current range.

DESCRIPTION OF THE PRIOR ART

Various combinations of transistors, voltage transformers, rectifiers, and filters are employed in prior art power supplies for converting an AC to a predetermined DC voltage, with the DC voltage being determined primarily by the AC voltage and the transformer turns ratio. In one particular prior art power supply, a 60-hertz AC signal at a root-mean-square (RMS) voltage of 115 volts is rectified to a 150-volt DC signal having a slight ripple as a result of the filtering action of a high-voltage capacitor, the DC signal is chopped up into a 0-to-150-volt square-wave signal at a selected higher frequency of, for example, 20 kilohertz, the square-wave signal is converted to a 150-volt AC signal at the selected frequency with two power transistors, the higher-frequency AC signal is converted to a lower AC voltage with a transformer, and the lower voltage is rectified to get a DC output. Such prior art systems, while capable of providing precision DC signals which can be used with microprocessors and similar electronic systems, have limited dynamic range for voltage and current. Thus, multiple power supplies are often needed to provide different DC signals. Also, such prior art power supplies are fairly expensive since they each require two power transistors and a high-voltage capacitor.

SUMMARY OF THE INVENTION

It is an object of the invention to provide a circuit for producing a precision bidirectional signal with an increased dynamic range of voltage, current, and/or frequency.

It is another object of the invention to provide a circuit for producing a precise, variably controllable DC output voltage with an increased dynamic range of voltage and current.

It is a further object of the invention to provide a circuit employing only one switching transistor for impressing a signal at a potentially variable frequency on an alternating current at a lower frequency.

It is a still further object of the invention to provide such a power supply circuit not requiring a high voltage capacitor.

The attainment of these and related objects is achieved through use of the novel power supply circuit disclosed herein. In one aspect of the invention, a circuit imposes a first signal at a first frequency on an alternating current at a second frequency lower than the first frequency. The first signal, which comprises a series of pulses of controllable pulse width, is supplied from a pulse generator at the first frequency. The alternating current, which periodically switches between two opposite current-flow directions, is supplied at the second frequency by a voltage/current source such as a standard 115-volt RMS 60-hertz AC source. A current-directing element is serially coupled through a pair of conductors to the AC source to receive the alternating current. Preferably, the current-directing element is a diode bridge. A switching transistor is coupled through its current-flow electrodes to the current-directing element. In response to the first signal, the transistor alternately switches on (for a specified on-time) and off (for a specified off-time) at the first frequency. When the transistor is on, the current-directing element channels the alternating current in a single current-flow direction through the current-flow electrodes of the transistor and then appropriately returns any channelled current flowing through the current-flow electrodes back to its original flow direction (of the two oppositely directed current-flow directions) in the conductors. When the transistor is off, the circuit is effectively open, and the voltage drop across the transistor is substantially equal to the voltage of the AC source. As a consequence, the time intervals between pulses of the first signal—i.e., the time intervals substantially occurring when the transistor is off—are impressed on the alternating current.

A load is serially coupled between the AC source and the current-directing element to receive the alternating current with the first signal impressed thereon. The load may comprise a single load device or a network of load devices.

In another aspect of the invention, a load device comprising a rectifying transformer and a filter is employed to convert the alternating current with the first signal imposed thereon to a DC signal at a substantially constant desired voltage. If the pulse generator is variable in its duty cycle, the voltage of the DC signal may be precisely varied over a substantial range.

Preferably, the (second) frequency of the AC source is at least an order of magnitude smaller than the (first) frequency of the first signal imposed on the alternating current. Even more preferably, the second frequency is two orders of magnitude or more lower than the first frequency. By having the second frequency substantially lower than the first frequency, relatively small magnetic elements may be employed in the invention; the precision of the power supply also increases.

In this manner, the present power supply has an improved dynamic range of voltage, current, and frequency for an AC output as well as an improved dynamic range of voltage and current for a DC output. The power supply of this invention is also both simpler and less expensive than the prior art power supply discussed above.

BRIEF DESCRIPTION OF THE DRAWINGS

Like reference symbols are employed in the drawings to represent the same item or items in the drawings and in the description of the preferred embodiments.

DESCRIPTION OF THE PREFERRED EMBODIMENTS

Figure 1:
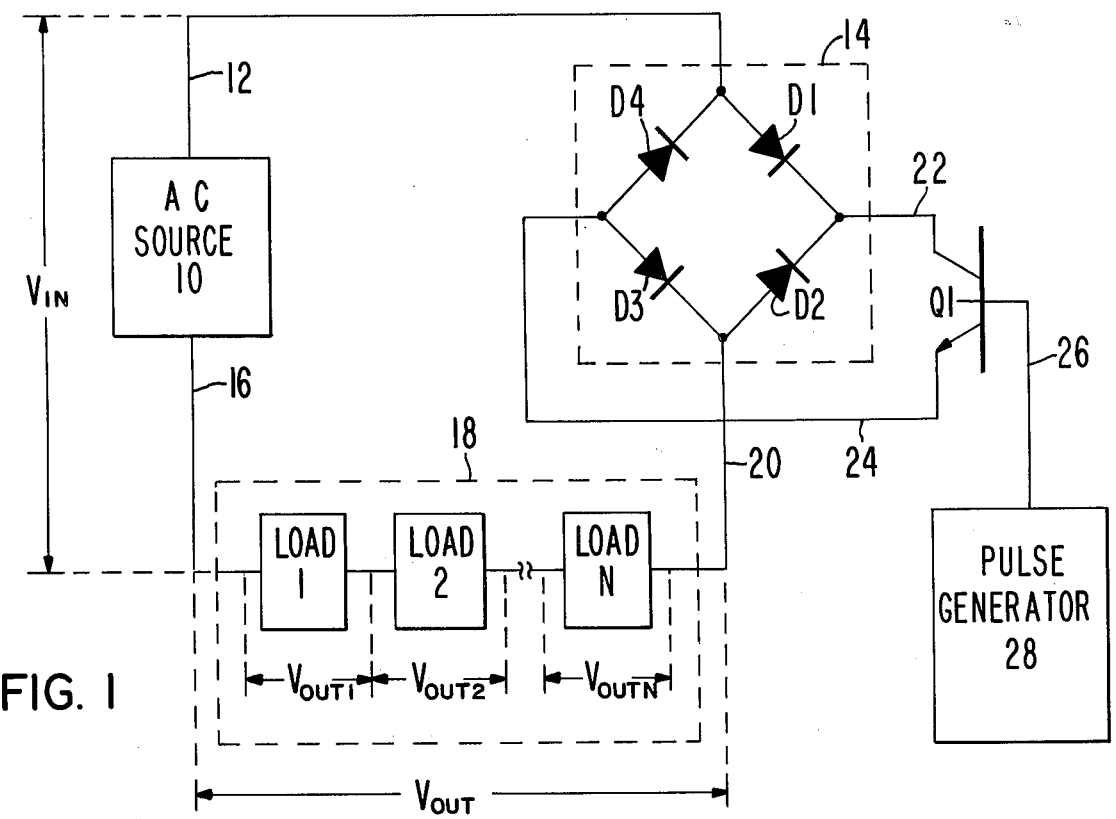
FIG. 1 is a circuit and block diagram of a power supply in accordance with the invention.

Turning to the drawings, FIG. 1 illustrates the basic elements of a power supply circuit in accordance with the invention. A voltage/current source 10 provides an alternating current (signal) from a pair of terminals at an input voltage $V_{IN}$ and at a selected input frequency $f_{IN}$. The AC signal may, for example, be a standard alternating current at input frequency $f_{IN}$ of 60 hertz and an RMS voltage of 115 volts.

AC source 10 is serially coupled through one of its terminals by a line 12 to a diode bridge 14 consisting of diodes D1, D2, D3, and D4. In particular, the cathode of diode D4 and the anode of diode D1 connect to line 12. AC source 10 is serially coupled from its other terminal by a line 16 through a load 18 and then by a line 20 to diode bridge 14. In particular, the cathode of diode D3 and the anode of diode D2 connect to line 20.

An NPN bipolar transistor Q1 has its collector electrode coupled to the cathodes of diodes D1 and D2 by a line 22 and its emitter electrode coupled to the anodes of diodes D3 and D4 by a line 24. Transistor Q1 could likewise be a PNP bipolar transistor. Alternatively, a field-effect transistor (FET) such as a Hex FET or a vertical FET could be used for transistor Q1 with the source-drain electrodes of the FET coupled to lines 22 and 24, respectively.

Diode bridge 14 is a current-directing element for channelling the alternating current received on lines 12 and 20 from AC source 10 in a single current-flow direction through the collector and emitter of transistor Q1 when transistor Q1 is conducting. Diode bridge 14 then returns current flowing through the collector and emitter of transistor Q1 appropriately back to lines 12 and 20 in the original direction in which the alternating current was flowing before entering diode bridge 14. In particular, diodes D1 and D2 full-wave rectify input AC signal $V_{IN}$ when transistor Q1 is on and provide the rectified current through line 22 to the collector of transistor Q1. Diodes D3 and D4 receive current passing through transistor Q1 from its emitter electrode by way of line 24 and appropriately provide this current to lines 12 and 20. More particularly, current flowing through diode D1 (from line 12) and then through the collector and emitter of transistor Q1 later flows through diode D3 to line 20. Conversely, current flowing through diode D2 (from line 20) and then through the collector and emitter of transistor Q1 later flows through diode D4 to line 12.

The base electrode of transistor Q1 receives a control (or drive) signal $V_P$ on a line 26 from a pulse generator 28. Signal $V_P$ consists of a series of pulses at a frequency f which is greater than frequency $f_{IN}$ of AC input signal $V_{IN}$. Frequency $f_{IN}$ may be just slightly lower than frequency $f_{IN}$. Overall operational performance and efficiency is, however, improved greatly if frequency $f_{IN}$ is substantially lower than frequency f. Preferably, frequency $f_{IN}$ is at least one order of magnitude (a factor of 10) less than frequency f. More preferably, frequency $f_{IN}$ is two orders of magnitude or more (a factor of 100 or more) lower than frequency f of pulse generator 28.

The voltage amplitude during pulse width $t_W$ of each pulse of signal $V_P$ is sufficiently above the threshold voltage of transistor Q1 so as to place transistor Q1 in the saturation conducting (completely on) mode. The voltage amplitude during the interval between each pair of pulses of signal $V_P$ is below the threshold voltage of transistor Q1 so as to turn transistor Q1 off. Consequently, transistor Q1 repetitively turns on for a time $t_{ON}$ and then off for a time $t_{OFF}$ where the sum of times $t_{ON}$ and $t_{OFF}$ equals the repetition period $t_{PERIOD}$ for signal $V_P$. On-time $t_{ON}$ and off-time $t_{OFF}$ are generally not equal to each other. Pulse width $t_W$ is substantially equal to on-time $t_{ON}$, and the interval between each pair of pulses of signal $V_P$ is therefore substantially equal to off-time $t_{OFF}$. Hereafter, pulse width $t_W$ is generally referred to as pulse width $t_{ON}$.

Turning transistor Q1 off effectively creates an open-circuit condition such that substantially no current flows through load 18 (or diode bridge 14). AC input voltage $V_{IN}$ then substantially equals the voltage drop $V_{CE}$ across the collector and emitter of transistor Q1. Therefore, as transistor Q1 alternately turns on and off at frequency f, signal $V_P$ is impressed on AC signal $V_{IN}$ to produce a bidirectional output signal which is received by load 18. This bidirectional output signal is represented by output voltage $V_{OUT}$ across load 18.

Load 18 may be either a single load device or a network of two or more load devices arranged in any desired combination of series and parallel load devices. FIG. 1 shows a series arrangement of N load devices designated as load 1, load 2, ... load N. The individual output voltages across load 1, load 2, ... load N are $V_{OUT1}$, $V_{OUT2}$, ... $V_{OUTN}$, respectively. Where there are multiple outputs, the voltage and current of each individual output signal depends on the nature of the load associated with the particular output signal and on the nature(s) of the load(s) associated with the other output signal(s). For example, in the network shown in FIG. 1, the voltage and current associated with output signal $V_{OUT2}$ depends on the nature of load 2 and on the natures of load 1, load N, and the other load device(s) between load 2 and load N.

Figure 2:
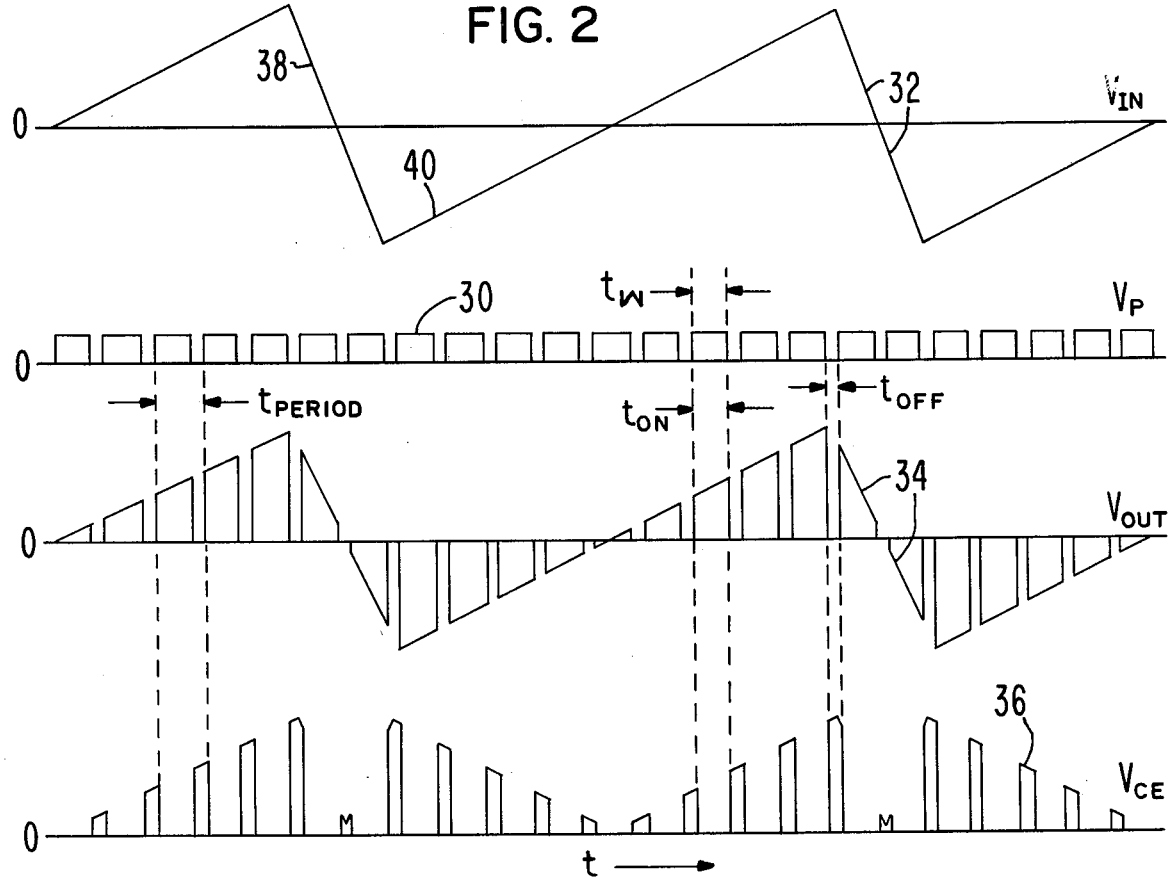
FIGS. 2 and 3 are sets of waveforms useful for understanding a power supply in accordance with the invention.
Figure 3:
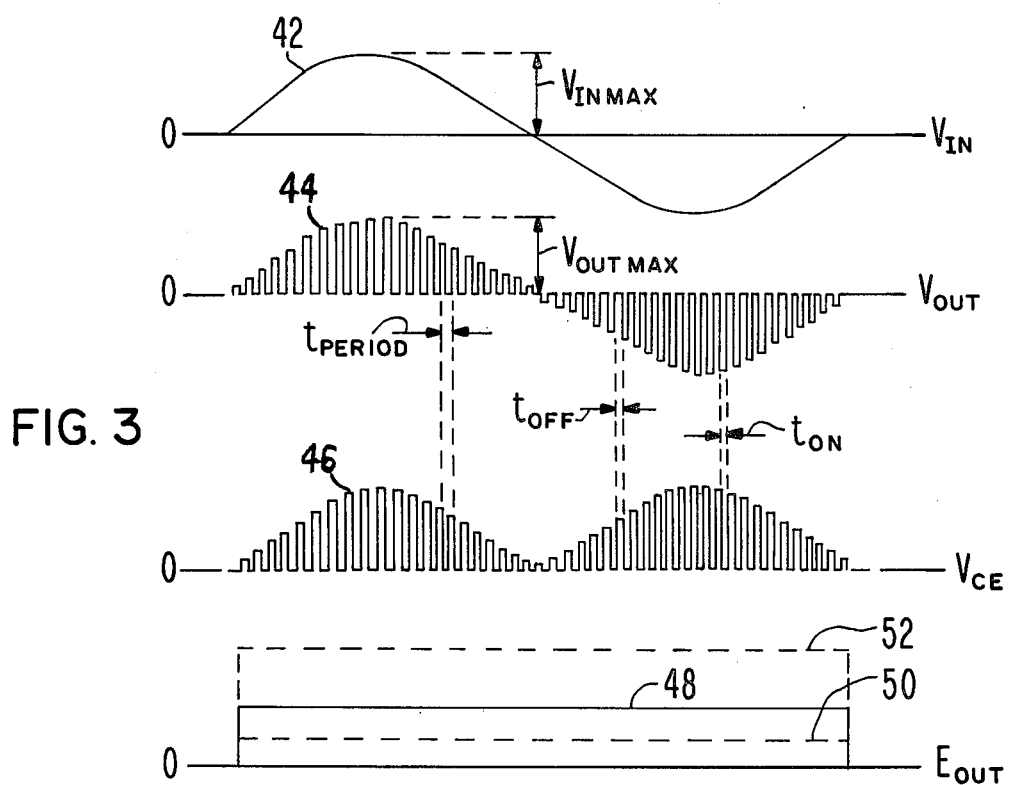

FIGS. 2 and 3 display examples of waveforms produced at various points in the circuit of FIG. 1 and useful in understanding the power supply circuit of the invention. Waveform 30 in FIG. 2 is an example of signal $V_P$ supplied by pulse generator 28 and consisting of a series of positive pulses of pulse width $t_{ON}$. Waveform 32 in FIG. 2 is an example of AC input signal $V_{IN}$ at frequency $f_{IN}$ supplied by AC source 10. AC input signal $V_{IN}$ may generally be any type of alternating current of which saw-tooth waveform 32 is exemplary. As another example, AC input signal $V_{IN}$ could be a series of positive and negative rectangular pulses.

Waveform 34 in FIG. 2 is bidirectional output signal $V_{OUT}$ across load 18 resulting from impressing control-signal waveform 30 on AC input waveform 32. As illustrated by waveform 34, output signal $V_{OUT}$ comprises a series of positive and negative pulses having an amplitude envelope corresponding to AC input signal $V_{IN}$. Each of the pulses of output signal $V_{OUT}$ has a pulse width approximately equal to pulse width $t_{ON}$ of signal $V_P$. The time between consecutive pulses of output signal $V_{OUT}$ is substantially equal to off-time $t_{OFF}$. The leading and trailing edges of each pulse of output signal $V_{OUT}$ follow the leading and trailing edges, respectively, of each corresponding pulse of signal $V_P$ by a small propagation time. This propagation delay is typically on the order of 100 nanoseconds. Since repetition period $t_{PERIOD}$ is typically at least two orders of magnitude greater than the propagation delay, the propagation delay is not illustrated in FIG. 2. Except for this very small propagation delay, the pulses of bidirectional output signal $V_{OUT}$ are in phase with the pulses of signal $V_P$—i.e., each pulse of output signal $V_{OUT}$ is of the same pulse width and occurs at substantially the same time as the corresponding pulse of signal $V_P$.

Where load 18 is a purely resistive load, the amplitude envelope of the pulses of output signal $V_{OUT}$ substantially mirrors AC input signal $V_{IN}$. If load 18 is partly inductive, a small amount of ringing occurs at the top (bottom) of each positive (negative) pulse of output signal $V_{OUT}$. If load 18 is partly capacitive, the top (bottom) of each positive (negative) pulse of output signal $V_{OUT}$ is slightly rounded.

Waveform 36 is collector-to-emitter voltage $V_{CE}$ occurring between lines 22 and 24 as the collector of transistor Q1 receives the full-wave rectified current from diode bridge 14 in response to waveforms 30 and 32. As shown by waveform 36, collector-to-emitter voltage $V_{CE}$ comprises a series of pulses having an amplitude envelope corresponding to a full-wave rectified version of input signal $V_{IN}$. The pulses of collector-to-emitter voltage $V_{CE}$ are out of phase with pulses of signal $V_P$—i.e., each pulse of collector-to-emitter voltage $V_{CE}$ has a pulse width of approximately off-time $t_{OFF}$ and occurs substantially during the off-time $t_{OFF}$ between the corresponding pair of pulses of signal $V_P$.

The power supply circuit of FIG. 1 operates in the following manner. During each positive wave of AC input signal $V_{IN}$, illustrated by waveform section 38 of waveform 32 in FIG. 2, there is one path for current along line 12, through diode D1, through the collector and emitter of transistor Q1, through diode D3, along line 20, through load 18, and along line 16 back to AC source 10. During each negative wave of AC input signal $V_{IN}$, illustrated by waveform section 40 of waveform 32 in FIG. 2, the current supplied along line 12 is negative, and, consequently, the current supplied along line 16 may be viewed as positive. Accordingly, the current path during each negative wave of input signal $V_{IN}$ is along line 16, through load 18, along line 20, through diode D2, through the collector and emitter of transistor Q1, through diode D4, and along line 12 back to AC source 10.

When transistor Q1 is fully conducting—i.e., in the saturation mode—one of the current paths is complete. If input signal $V_{IN}$ is positive, current from AC source 10 flows in a first current-flow direction along the first current path. If input signal $V_{IN}$ is negative, current from AC source 10 flows along the second current path in a second current-flow direction opposite to the first current-flow direction. Ideally, no voltage loss occurs across either transistor Q1 or across either pair of diodes in the respective complete current path (i.e., either diodes D1 and D3 or diodes D2 and D4) when transistor Q1 is on, so that all of input voltage $V_{IN}$ appears across load 18 as output voltage $V_{OUT}$. When signal $V_P$ causes transistor Q1 to turn off, both current paths are open so that no voltage drop occurs across load 18. Consequently, the low-voltage off-time intervals $t_{OFF}$ between consecutive pulses of signal $V_P$ are impressed on AC input signal $V_{IN}$ and appear as zero-voltage intervals of width $t_{OFF}$ in output signal $V_{OUT}$.

Referring to FIG. 3, waveform 42 is an example where input signal $V_{IN}$ is a sine wave $V_{INMAX} \sin(2\pi f_{IN} t)$ where $V_{INMAX}$ is the maximum amplitude of waveform 42. Waveform 42 might be, for instance, a conventional alternating current at input frequency $f_{IN}$ of 60 hertz. Waveform 44 is output signal $V_{OUT}$ across load 18 resulting from imposing signal $V_P$ (not shown in this case) from pulse generator 28 on waveform 42. The amplitude envelope of waveform 44 corresponds substantially to waveform 42, and the maximum amplitude $V_{OUTMAX}$ (of the amplitude envelope) of waveform 44 is ideally equal to maximum amplitude $V_{INMAX}$. Waveform 46 is collector-to-emitter voltage $V_{CE}$ which occurs when the pulses at frequency f of signal $V_P$ are impressed on waveform 42.

As described below, load 18 comprises a rectifying transformer and suitable voltage/current averaging elements in some embodiments. A substantially constant DC voltage signal $E_{OUT}$, shown as waveform 48 in FIG. 3, is then available at an output of the rectifying transformer and voltage/current averaging elements. The voltage level of DC signal $E_{OUT}$ is dependent on the duty cycle D of pulse generator 28. If duty cycle D of pulse generator 28 is variable, DC signal $E_{OUT}$ varies with the duty cycle. Waveforms 50 and 52 indicate the variation of DC output $E_{OUT}$ where the duty cycle is approximately one-half and twice, respectively, that of waveform 48.

The relationship between duty cycle and DC output $E_{OUT}$ is derived as follows. Duty cycle D which varies from zero percent to one hundred percent (or 0 to 1) is defined as $$D = \frac{t_{ON}}{t_{ON} + t_{OFF}} = \frac{t_{ON}}{t_{PERIOD}} = f t_{ON} \quad (1)$$

Frequency f is the inverse of total repetition period $t_{PERIOD}$.

Ideally, the amplitude envelope of bidirectional output signal $V_{OUT}$ is substantially identical to AC input signal $V_{IN}$. By Fourier analysis, the average absolute value $V_{OUTAVG}$ of output signal $V_{OUT}$ is $$V_{OUTAVG}(ideal) = D V_{INAVG} \quad (2)$$

where $V_{INAVG}$ is the average absolute value of AC input signal $V_{IN}$. Average input voltage $V_{INAVG}$ is expressed as a function of the parameters defining AC input signal $V_{IN}$. For example, where input signal $V_{IN}$ is sine wave 42 with maximum amplitude $V_{INMAX}$, Fourier analysis (integration) leads to $$V_{INAVG} = \frac{2}{\pi} V_{INMAX} \approx 0.64 V_{INMAX} \quad (3)$$

Combining Eqs. (1) and (2) then gives $$V_{OUTAVG}(ideal) = f t_{ON} V_{INAVG} \quad (4)$$

Where load 18 is a full-wave rectifying transformer with suitable voltage/current averaging elements, the average output voltage from the secondary coil ideally equals DC output $E_{OUT}$ which is then given by the turns ratio formula as $$E_{OUT}(\text{ideal}) = \frac{N_{SEC}}{N_{PRI}} E_{IN} = \gamma E_{IN} \quad (5)$$

where $E_{IN}$ is the average input voltage to the primary coil, $N_{PRI}$ is the number of turns of the primary coil, $N_{SEC}$ is the number of turns of the secondary coil, and $\gamma$ is the turns ratio. Combining Eqs. (4) and (5) and noting that average input voltage $E_{IN}$ across the primary coil ideally equals average output $V_{OUTAVG}$ for load 18 yields $$E_{OUT}(\text{ideal}) = \gamma f t_{ON} V_{INAVG} \quad (6)$$

Actually, losses occur in transistor Q1, in diode bridge 14, and in the voltage transforming, rectifying, and averaging circuitry of load 18. These losses may be represented by an efficiency $\eta$ which varies from 0 to 1. For ideal operation, efficiency $\eta$ is 1. Efficiency $\eta$ is typically about 0.8. Upon adding efficiency $\eta$, Eq. 6 becomes $$E_{OUT} = \eta \gamma f t_{ON} V_{INAVG} \quad (7)$$

In the case of sine wave 42

$$E_{OUT} = \frac{2}{\pi} \eta \gamma f t_{ON} V_{INMAX} \quad (8)$$

Accordingly, DC output $E_{OUT}$ varies linearly with duty cycle $D = f t_{ON}$. At constant frequency f, DC output $E_{OUT}$ is directly proportional to on-time $t_{ON}$, and at constant on-time $t_{ON}$, DC output voltage $E_{OUT}$ is directly proportional to frequency f.

Figure 4:
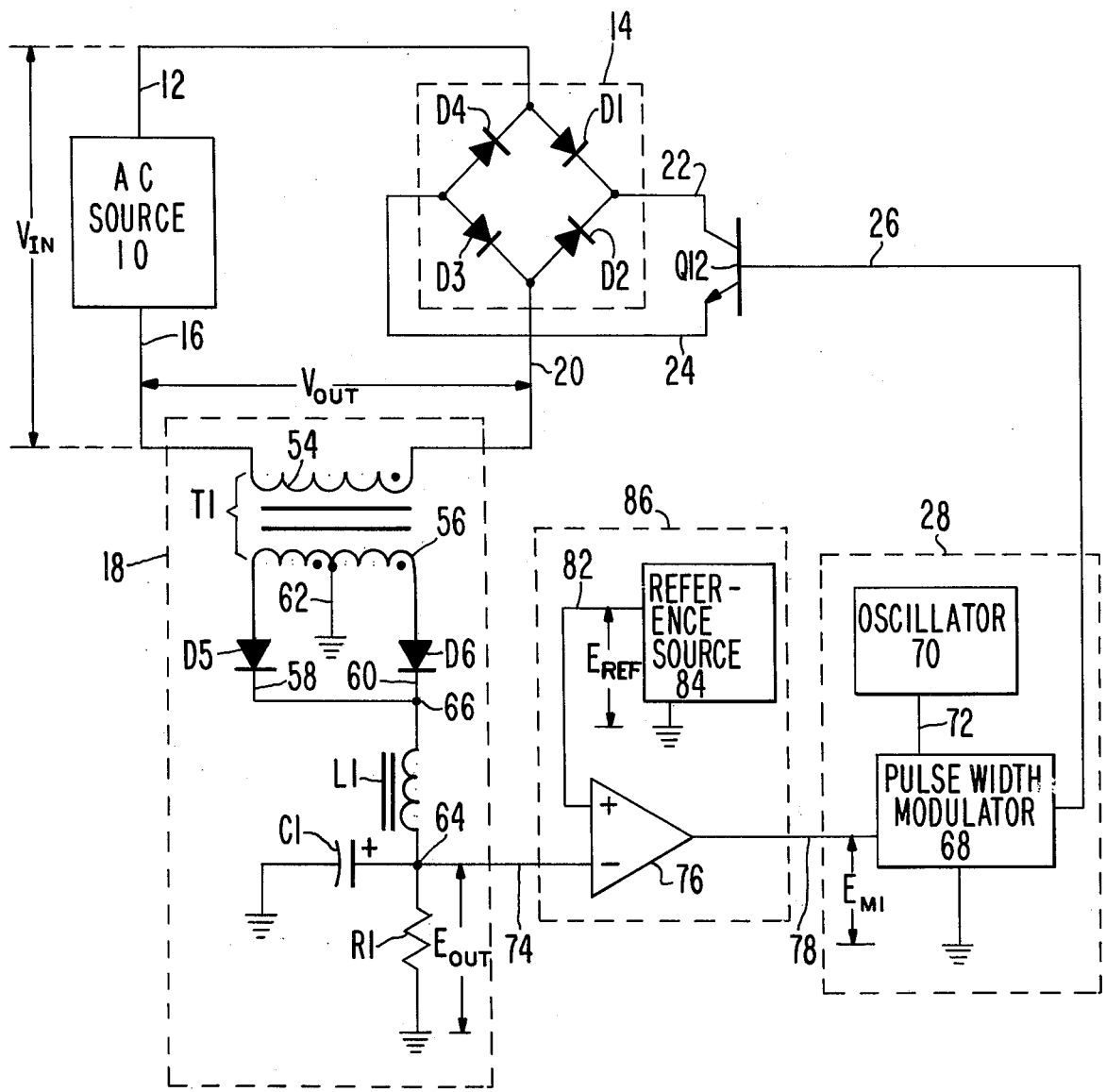
FIG. 4 is a circuit and block diagram of an embodiment of the power supply of FIG. 1 in which a precisely controlled DC output voltage is produced employing a rectifying transformer, a filter, and a pulse generator containing a pulse width modulator.

FIG. 4 shows a power supply according to the invention in more detail. As in FIG. 1, AC source 10 and load 18 are serially coupled to each other and to diode bridge 14 across which the collector and emitter of transistor Q1 are coupled, its base being coupled to pulse generator 28. Load 18 in FIG. 4 is a rectifying transformer and choke-input filter together comprising a transformer T1, a pair of diodes D5 and D6, an inductor L1, a capacitor C1, and a load resistor R1. Primary winding 54 of transformer T1 is coupled to AC source 10 and diode bridge 14 by lines 16 and 20, respectively. Transformer T1 converts the operational level of signal $V_{OUT}$ to a different (voltage and current) operational level in secondary winding 56. Diodes D5 and D6 on lines 58 and 60, respectively, from the opposite ends of secondary winding 56 in combination with a grounded center tap 62 provide full-wave rectification of the transformed signal induced in secondary winding 56. Inductor L1, which is connected between a node 64 and a node 66 connecting to lines 58 and 60, and capacitor C1, which is connected between node 64 and ground reference, comprise the choke-input filter which averages the rectified signal from diodes D5 and D6. Resistor R1, which is connected between node 64 and ground, provides a load to utilize DC signal $E_{OUT}$ produced at node 64 by rectifying transformer T1, D5, and D6 and associated filter L1 and C1.

In the embodiment depicted in FIG. 4, pulse generator 28 provides pulses of variable pulse width $t_{ON}$ at substantially constant frequency f to the base of transistor Q1. Pulse generator 28 in FIG. 4 comprises a pulse width modulator 68 whose output is signal $V_P$ on line 26 and an oscillator 70 whose output signal feeds in on a line 72 to pulse width modulator 68. Pulse width modulator 68 is typically a monostable multivibrator (one-shot), and oscillator 70 is typically an astable multivibrator. Responsive to oscillation pulses on line 72 supplied once each period $t_{PERIOD}$ by oscillator 70, pulse width modulator 68 generates the rectangular control signal pulses on line 26 once each repetition period $t_{PERIOD}$.

The width of each rectangular pulse is controlled principally by a modulation voltage $E_{M1}$ supplied to the control input of pulse width modulator 68. Generally, on-time $t_{ON}$ increases with increasing modulation voltage $E_{M1}$. For example, the relationship between modulation voltage $E_{M1}$ and on-time $t_{ON}$ may approximately be $$t_{ON} = k_1 E_{M1} + k_2 \quad (9)$$

where $k_1$ is a selected positive constant and $k_2$ is another constant. Using pulse width modulator 68, duty cycle D is varied by varying on-time $t_{ON}$ at substantially constant frequency f. Accordingly, output $E_{OUT}$ varies according to Eq. (7) or (8) above where $\gamma$ is the turns ratio of transformer T1.

In order to regulate DC signal $E_{OUT}$, a feedback loop is provided on a line 74 from node 64 to the inverting input terminal of a differential amplifier 76. The amplified differential output of differential amplifier 76 consists of modulation voltage $E_{M1}$ which feeds in on line 78 to the control input of pulse width modulator 68. A reference voltage $E_{REF}$ is supplied on a line 82 from a reference source 84 to the non-inverting input terminal of differential amplifier 76. Reference source 84 may be a zener diode or other monovoltaic reference. Differential amplifier 76 and reference source 84 have been illustrated as a feedback circuit 86 but could alternatively be considered as part of pulse generator 28. Additionally, a voltage divider could be included on line 76 so that only a fraction $\beta$ of DC output $E_{OUT}$ is provided to differential amplifier 76.

Differential amplifier 76 operates according to $$E_{M1} = A(E_{REF} - E_{OUT}) \quad (10)$$

where A is the amplification of differential amplifier 76. Reference voltage $E_{REF}$ is normally a small amount greater than the desired value of DC output voltage $E_{OUT}$. If DC output $E_{OUT}$ increases, modulation voltage $E_{M1}$ decreases according to Eq. (10) and on-time $t_{ON}$ also decreases, for example, according to Eq. (9); the decrease in on-time $t_{ON}$ then causes DC signal $E_{OUT}$ to decrease according to Eq. (7) or (8) which stabilizes the power supply. On the other hand, a drop in DC output $E_{OUT}$ causes modulation voltage $E_{M1}$ and on-time $t_{ON}$ to increase, causing DC signal $E_{OUT}$ to rise and again stabilizing the power supply. Therefore, DC output $E_{OUT}$ and output signal $V_{OUT}$ as well may be precisely regulated using the feedback loop.

Figure 5:
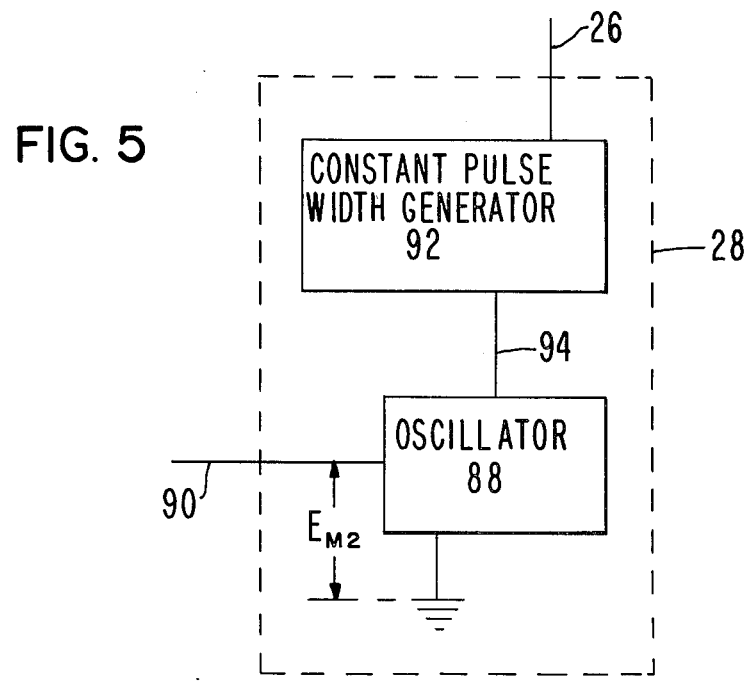
FIG. 5 is a block diagram of a variable-frequency pulse generator alternatively employable in the embodiment of FIG. 4.

FIG. 5 illustrates an embodiment in which pulse generator 28 is a variable-frequency system; duty cycle D is controlled by varying frequency f of signal $V_P$ at constant pulse width $t_{ON}$. In FIG. 5, pulse generator 28 comprises an oscillator 88 whose control input receives a modulation voltage $E_{M2}$ on a line 90 and a constant pulse-width generator 92 which supplies pulses of constant width $t_{ON}$ on line 26 in response to oscillation pulses at frequency f on a line 94 from oscillator 88.

Frequency f of the oscillation pulses is controlled by varying modulation voltage $E_{M2}$. Oscillator 88 is typically an astable multivibrator. Constant pulse width generator 92 is typically a monostable multivibrator whose control input is coupled to a constant reference source (not shown) to ensure that pulse width $t_{ON}$ is constant.

Voltage regulation of the power supply of the invention in which pulse generator 28 of FIG. 5 is employed is accomplished with a feedback loop similar to that of FIG. 4. Line 90 connects to a differential amplifier such as differential amplifier 76. Because frequency f (generally) decreases with increasing modulation voltage $E_{M2}$, the connections of the lines carrying DC output $E_{OUT}$ and reference voltage $E_{REF}$ to the inputs of the differential amplifier must be reversed from that shown in FIG. 4.

Figure 6:
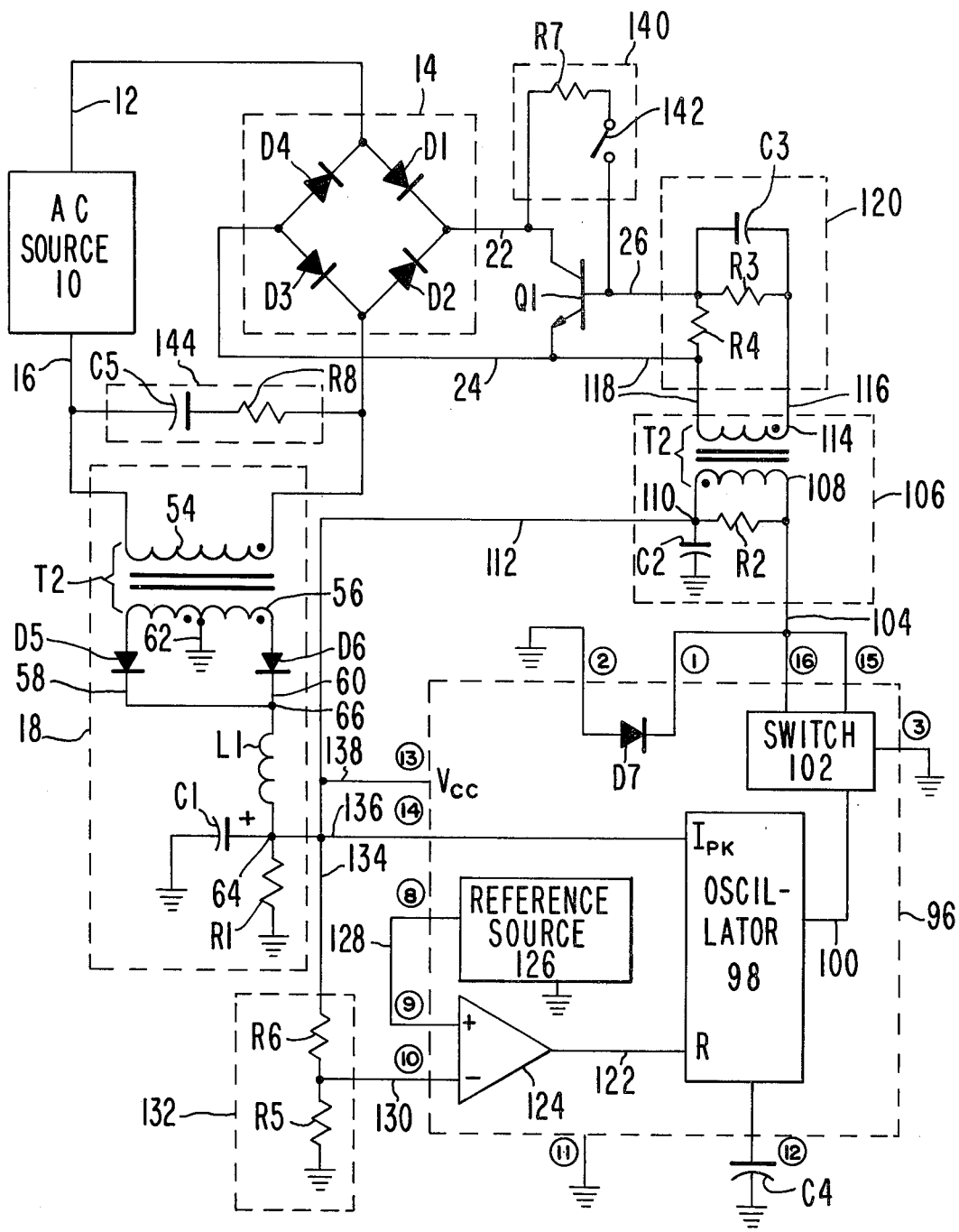
FIG. 6 is a circuit and block diagram of an embodiment of the power supply of FIG. 1 in which a precisely controlled DC output voltage is produced employing a rectifying transformer, a filter, and a variable-frequency pulse generator different from the pulse generator of FIG. 5.

FIG. 6 illustrates an embodiment of a precision power supply in which another type of variable-frequency system is employed to generate signal $V_P$. AC source 10, diode bridge 14, transistor Q1, and load 18 comprising rectifying transformer T1, D5, and D6, filter L1 and C1, and load resistor R1 in FIG. 6 are all respectively connected to one another as described above for FIGS. 1 and 4.

A commercially available integrated circuit universal switching regulator subsystem 96 such as that designated by product number μA78S40 and made by Fairchild Camera and Instrument Corporation (Fairchild), Mountain View, Calif., is employed as the principal component of pulse generator 28 (not specifically delineated in FIG. 6). Regulator subsystem 96 also forms part of a feedback loop for regulating DC voltage $E_{OUT}$. The underlined numbers adjacent to regulator subsystem 96 indicate pin positions for the Fairchild μA78S40. The Fairchild μA78S40 is described in Voltage Regulator Handbook (1978), Pages 7-128—7-132, issued by Fairchild. The Fairchild μA78S40 is further described by T. Vaeches in "μA78S40 Switching Voltage Regulator Applications," Application Note No. 344, Fairchild, 1978, pp. 1-13. Regulator subsystems of the type of the Fairchild μA78S40 are described by R. Apfel in "Regulators to Switch or Not?" *Electronics Products Magazine*, August 1977, pp. 39-45. These three documents are specifically incorporated by reference herein.

An oscillator 98 within regulator subsystem 96 provides (positive) oscillator pulses on a line 100 to a switch 102. Each oscillator pulse causes switch 102 to change state and provide an inverted pulse through pins 15 and 16 on a line 104 to one input of an isolation device 106 external to regulator subsystem 96.

Isolation device 106 serves to isolate line 104 from AC source 10. As shown in FIG. 6, isolation device 106 comprises a transformer T2 having its primary coil 108 coupled at one end to line 104 and coupled at the other end through a node 110 by a line 112 to node 64 at which output voltage $E_{OUT}$ is supplied from load 18. Output voltage $E_{OUT}$ on line 112 temporarily acts as a constant voltage supply for isolation device 106. A capacitor C2 between line 112 and ground reference reduces undesired voltage variations at node 110. A resistor R2 is coupled between line 104 and node 110 and consequently across primary coil 108. Each inverted pulse on line 104 is reinverted at node 110 and then converted in the secondary coil 114 to a pulse of the same (positive) orientation as the corresponding oscillator pulse from oscillator 98. Isolation device 106 could alternatively be an optical coupler.

The pulses induced in secondary winding 114 are supplied on a pair of lines 116 and 118 from the ends of secondary winding 114 to a base driver 120. Line 118 is the low-voltage (or reference-voltage) line. Base driver 120 appropriately adjusts the voltage and current level of the pulses on line 116 (in conjunction with line 118) to a level suitable for driving the base (or base-emitter junction) of transistor Q1. Base driver 120 also limits the amount of current that can be supplied to the base of transistor Q1 so as to prevent an overload. Base driver 120 comprises a resistor R3 coupled between line 116 and line 26 on which signal $V_P$ is supplied, a capacitor C3 connected across resistor R3, and a resistor R4 connected between line 26 and line 118 which connects to the emitter of transistor Q1.

Oscillator 98 receives at its reset input terminal R on a line 122 the output signal from a comparator 124. A reference source 126 provides a reference voltage by a line 128 across pins 8 and 9 to the non-inverting input terminal of comparator 124. Its inverting terminal receives on a line 130 through pin 10 selected fraction $\beta$ of output voltage $E_{OUT}$ from a voltage divider 132 consisting of a resistor R5 connected between line 130 and ground and a resistor R6 connected between line 130 and node 64 by way of a line 134.

When voltage $\beta E_{OUT}$ (where $\beta$ equals the resistance of resistor R6 divided by the sum of the resistances of resistors R5 and R6) from voltage divider 132 exceeds the reference voltage from reference source 126, comparator 124 provides a high voltage output signal to reset terminal R of oscillator 98. This high voltage does not reset oscillator 98, and it provides oscillator pulses at a constant normal frequency $F_0$. When voltage $\beta E_{OUT}$ drops below the reference voltage from reference source 126, comparator 124 provides a low voltage to reset terminal R which causes oscillator 98 to be reset. An oscillator pulse is generated immediately after oscillator 98 is reset. Providing a low voltage on line 122 to reset terminal R causes oscillator 98 to be reset continually at frequency f which is greater than normal frequency $f_0$. Since an oscillator pulse is generated each time oscillator 98 is reset, a low voltage from comparator 124 has the effect of increasing the frequency at which oscillator pulses are produced from frequency $f_0$ to frequency f. In turn, output voltage $E_{OUT}$ increases according to Eq. (7) or (8) until voltage $\beta E_{OUT}$ increases sufficiently to cause comparator 124 to provide a high voltage to reset terminal R after which the cycle begins anew. In combination, comparator 124 and oscillator 98 constitute a feedback-controlled variable frequency oscillator.

Additionally, a capacitor C4 to ground from pin 12 to oscillator 98 sets normal frequency $f_0$. The sense input $I_{PK}$ of oscillator 98 is disabled by connecting the sense $I_{PK}$ terminal to DC output $E_{OUT}$ at node 64 by a line 136 through pin 14. DC output $E_{OUT}$ is provided as the power supply for regulator subsystem 96 to its $V_{CC}$ input terminal at pin 13 by a line 138 from node 64. A diode D7 connected by pin 2 to ground and by pin 1 to line 104 prevents reverse voltage inductance spikes in switch 102 from transformer T2.

A start-up circuit 140 comprising a resistor R7 and a normally open single-pole switch 142 serially coupled between lines 22 and 26 is employed for initiating operation of the embodiment of FIG. 6. A snubber circuit 144 comprising a resistor R8 and a capacitor C5 serially coupled between lines 16 and 20 damps undesirable transient voltage spikes in the circuit.

Oscillator 98, switch 102, and comparator 124 comprise pulse generator 28. Isolation device 106 and base driver 120 may also be viewed as part of pulse generator 28, such that signal $V_P$ is therefore provided from pulse generator 28 of FIG. 6. Alternatively, isolation device 106 and base driver 120 may be considered separate elements. The feedback circuit corresponding to feedback circuit 86 of FIG. 4 generally comprises comparator 124, reference source 126, and voltage divider 132.

In a preferred embodiment of FIG. 6, diode bridge 14 is a commercially available diode bridge such as that designated by product number MDA3506FR and obtainable from Motorola, Inc., Semiconductor Products Division (Motorola), Phoenix, Ariz. Transistor Q1 is a commercially available power transistor such as that designated by product number 2N6547 and obtainable from Motorola. Primary winding 54 of transformer T1 consists of 93 turns of No. 24 insulated copper wire. Secondary winding 56 consists of 10 turns of No. 18 insulated copper wire. A core such as that designated by product number 528T500-3E2A and obtainable from Ferroxcube, Saugerties, N.Y., is employed in transformer T1. Diode D5 and D6 are diodes such as those designated by product number MR824 and obtainable from Motorola. Inductor L1 has a value of 10 microhenries.

The primary winding of transformer T2 consists of 20 turns of No. 27 insulated copper wire, and the secondary winding consists of 7 turns of No. 21 insulated copper wire. Transformer T2 has a core such as that designated by product number 2213-3E2A and available from Ferroxcube. The other resistors and capacitors preferably have the values indicated in Table I.

TABLE I

| Resistor | Value (kilohms) | Capacitor | Value (microfarads) |
|---|---|---|---|
| R1 | 0.005 | C1 | 1000 |
| R2 | 1.0 | C2 | 0.1 |
| R3 | 0.0047 | C3 | 0.001 |
| R4 | 0.01 | C4 | 0.0015 |
| R5 | 1.7 | C5 | 0.02 |
| R6 | 18 | | |
| R7 | 1.0 | | |
| R8 | 0.47 | | |

The preferred embodiment described above and shown in FIG. 6 produces the results shown in Table II where frequency f is about 20 kilohertz and AC input signal $V_{IN}$ is a standard sine wave alternating current, such as waveform 42 of FIG. 3, at input frequency $f_{IN}$ of 60 hertz and an RMS voltage of 115 volts (maximum amplitude $V_{INMAX}$ being about 159 volts).

TABLE II

| $E_{OUT}$/Waveform 48 (volts) | $I_{OUT}$ (amperes) |
|---|---|
| 15.17 | 1 |
| 15.09 | 2 |
| 14.98 | 3 |
| 14.87 | 4 |

$I_{OUT}$ is the current flowing through load resistor R1. The overall efficiency is about 74 percent with a line regulation in DC output $E_{OUT}$ of about 1 percent. Duty cycle D for achieving the above DC output $E_{OUT}$ of about 15 volts is 60 percent. DC output $E_{OUT}$ is about 5 volts with a 20 percent duty cycle and about 20 volts with an 80 percent duty cycle.

While pulse generator 28 has been described above as either a variable frequency device or a variable pulse width device, both pulse width $t_{ON}$ and frequency f of pulse generator 28 may be variable. In such an embodiment, a first modulation voltage feeds into the control input of an oscillator (such as an astable multivibrator) to control frequency f of oscillation pulses which feed into a monostable multivibrator which produces pulses whose width is controlled by a second modulation voltage supplied to the control input of the monostable multivibrator. The modulation voltages may be generated by appropriately comparing output $E_{OUT}$ of a fraction of output $E_{OUT}$ with one or two reference values to provide precise regulation of outputs $V_{OUT}$ and $E_{OUT}$.

It should be apparent to those skilled in the art that the power supply circuit is capable of achieving the stated objects of the invention. The circuit employs only a single power transistor and requires no high voltage capacitors for converting a conventional AC at a given frequency to a variable, regulated DC voltage over a substantial variation of currents. By varying the duty cycle, different DC voltages can be obtained. Alternatively, the invention may be employed to impose pulses at a specified frequency on an alternating current at a lower frequency. The resulting bidirectional current is obtained using only a single transistor.

While the invention has been described with reference to particular embodiments, the description is solely for the purpose of illustration and is not to be construed as limiting the scope of the invention claimed below. For example, the AC source may supply a partially or fully rectified alternating current instead of the non-rectified alternating current described above. A base driver or an isolation device or both might be included in a pulse generator of the variable pulse width type. It is intended that such changes be included within the spirit and scope of the invention as defined by the claims appended hereto.

What is claimed is:

1. A power supply circuit for converting an alternating current at an input frequency into an output signal at an output voltage/current level different from the input voltage/current level of the alternating current, a voltage/current source supplying the alternating current which alternately switches flow between a pair of current-flow directions opposite to each other, the circuit comprising:

means responsive to a feedback signal for generating a first signal at a first frequency at least one order of magnitude greater than the input frequency;

a switching transistor which alternately switches on and off at the first frequency in response to the first signal, the transistor having a pair of current-flow electrodes;

means for directing the alternating current in a single current-flow direction through the current-flow electrodes when the transistor is on and for directing current flowing through the current-flow electrodes back to its original current-flow direction of the pair of current-flow directions, the means for directing substantially not directing current to the current-flow electrodes when the transistor is off, the first signal thereby being impressed on the alternating current to define a second signal;

means, serially coupled between the voltage/current source and the means for directing, for rectifying the second signal and for averaging it with respect to time to produce the output signal therefrom; and feedback means responsive to the output signal for producing the feedback signal to provide feedback regulation of the output signal.

2. A circuit as in claim 1 wherein the means for generating comprises:
   means for providing an oscillator signal comprising a series of oscillator pulses at the first frequency; and
   means responsive to the oscillator and feedback signals for generating the first signal as a series of pulses of a controllable pulse width at the first frequency, the pulse width varying as the feedback signal varies.

3. A circuit as in claim 2 wherein the feedback means comprises:
   means responsive to the difference between a reference signal and a signal bearing a specified relationship to the output signal for amplifying the difference to generate the feedback signal; and
   means for supplying the reference signal.

4. A circuit as in claim 1 wherein the means for generating comprises:
   means responsive to the feedback signal for providing an oscillator signal comprising a series of oscillator pulses at the first frequency which varies as the feedback signal varies; and
   means responsive to the oscillator signal for generating the first signal as a series of pulses of a substantially constant pulse width at the first frequency.

5. A circuit as in claim 4 wherein the feedback means comprises:
   means responsive to the difference between a reference signal and a signal bearing a specified relationship to the output signal for amplifying the difference to generate the feedback signal; and
   means for supplying the reference signal.

6. A circuit as in claim 1 wherein the means for generating comprises:
   means for normally producing first oscillator pulses at a given first period between each pair of consecutive first pulses and, responsive to the feedback signal whenever it attains a selected value, for producing second oscillator pulses at a given second period between each pair of second pulses, the second period being greater than the first period; and
   means responsive to the oscillator pulses for providing the first signal as a series of pulses of a substantially constant pulse width at the first frequency which substantially equals (1) the inverse of the first period when a group of the first pulses is produced and (2) the inverse of the second period when a group of the second pulses is produced.

7. A circuit as in claim 6 wherein the feedback means comprises:
   means for producing the selected value of the feedback signal whenever a specified first relationship is attained between a reference signal and a third signal bearing a specified second relationship to the output signal;
   means for supplying the reference signal; and
   means responsive to the output signal for operating thereon to produce the third signal.

8. A circuit as in claim 7 wherein the specified first relationship is substantial equality of the reference and third signals and the specified second relationship is defined as the third signal being substantially a given fraction of the output signal.

9. A circuit as in claim 8 wherein the means for producing the selected value is a comparator.

10. A circuit as in claim 6, 7, 8, or 9 and further including means for electrically isolating the means for providing the first signal from the voltage/current source.

11. A circuit as in claim 10 wherein the means for electrically isolating comprises a transformer having (1) a primary coil coupled to the means for providing the first signal and (2) a secondary coil coupled to the transistor.

12. A circuit as in claim 1, 2, 4, or 6 wherein the transistor is turned on during a time corresponding to the pulse width.

13. A circuit as in claim 12 wherein (1) the transistor is a bipolar transistor having its base coupled to the means for generating for receiving the first signal and (2) the current-flow electrodes are an emitter and a collector electrode.

14. A circuit as in claim 1, 2, 4, or 6 wherein the means for directing comprises a diode bridge.

15. A circuit as in claim 14 wherein the means for rectifying comprises:
   a transformer having (1) a primary coil coupled between the voltage/current source and the means for directing and (2) a secondary coil;
   a rectifier coupled to the secondary coil; and
   a capacitor coupled between a constant reference potential and the rectifier.

16. A circuit as in claim 15 wherein the output signal is taken across a resistor coupled between the constant reference potential and the rectifier.

17. A circuit as in claim 16 wherein the means for directing further includes an inductor coupled between the capacitor and the rectifier.

* * * * *